United States Patent
Ehrlich (10) Patent No.: US 7,019,925 B2
(45) Date of Patent: Mar. 28, 2006

(54) VARIABLE FREQUENCY CHEVRON IN PRINTED MEDIA REFERENCE PATTERN TO IMPROVE SERVO DEMODULATION

(75) Inventor: Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/816,786

(22) Filed: Apr. 2, 2004

(65) Prior Publication Data
US 2005/0275963 A1 Dec. 15, 2005

Related U.S. Application Data

(60) Provisional application No. 60/460,205, filed on Apr. 2, 2003.

(51) Int. Cl.
*G11B 5/09* (2006.01)

(52) U.S. Cl. .............................. 360/48; 360/17; 360/75
(58) Field of Classification Search ..................... None
See application file for complete search history.

(56) References Cited

U.S. PATENT DOCUMENTS

| | | | |
|---|---|---|---|
| 5,107,378 A | 4/1992 | Cronch | |
| 5,966,264 A | 10/1999 | Belser | |
| 6,023,389 A | 2/2000 | Cunningham | |
| 6,025,970 A | 2/2000 | Cheung | |
| 6,411,459 B1 | 6/2002 | Belser | |
| 6,445,521 B1 | 9/2002 | Schaff | |
| 6,738,205 B1 * | 5/2004 | Moran et al. | 360/17 |
| 6,754,016 B1 * | 6/2004 | Messner et al. | 360/48 |
| 2002/0135927 A1 | 9/2002 | Yatsu | |
| 2003/0123174 A1 * | 7/2003 | Hennecken et al. | 360/51 |
| 2003/0161061 A1 | 8/2003 | Lamberts | |

FOREIGN PATENT DOCUMENTS

| | | |
|---|---|---|
| JP | 61211814 | 9/1986 |
| JP | 63025803 | 2/1988 |
| JP | 10334402 | 12/1998 |

* cited by examiner

*Primary Examiner*—David Hudspeth
*Assistant Examiner*—Dan I Davidson
(74) *Attorney, Agent, or Firm*—Fliesler Meyer LLP (57) ABSTRACT

Reference patterns in accordance with the present invention can include variable frequency chevrons incorporated into a reference pattern on a printed media surface to improve servo demodulation. In one embodiment, the reference pattern can include one or more servo wedges having a preamble including digital information at a first frequency relative to the head when the rotatable medium is rotated at a spin speed. The servo wedges further include at least one field having a first set of a plurality of phase-bursts forming a positive chevron angle relative to the preamble and a second set of a plurality of phase-bursts forming a negative chevron angle relative to the preamble, wherein a frequency of the at least one field relative to the head when the rotatable medium is rotated at the spin speed varies between a first end of the media surface and a second end.

20 Claims, 5 Drawing Sheets

VARIABLE FREQUENCY CHEVRON IN PRINTED MEDIA REFERENCE PATTERN TO IMPROVE SERVO DEMODULATION

CLAIM OF PRIORITY

This application claims priority from U.S. Provisional Patent Application No. 60/460,205 entitled "Variable Frequency Chevron in Printed Media Reference Pattern to Improve Servo Demodulation" by Richard M. Ehrlich, filed Apr. 2, 2003 incorporated herein by reference.

CROSS-REFERENCED CASES

The following applications are cross-referenced and incorporated herein by reference:

U.S. Provisional Patent Application No. 60/436,709 entitled "Systems for Multi-Pass Self-Servowriting," by Richard M. Ehrlich, filed Dec. 27, 2002.

U.S. Provisional Patent Application No. 60/436,712 entitled "Systems for Self-Servowriting Using Write-Current Variation," by Richard M. Ehrlich, filed Dec. 27, 2002.

U.S. Provisional Patent Application No. 60/436,703 entitled "Methods for Self-Servowriting Using Write-Current Variation," by Rick Ehrlich, filed Dec. 27, 2002.

U.S. Provisional Patent Application No. 60/436,673 entitled "Systems for Selective Multi-Pass Servowriting and Self-Servowriting," by Richard M. Ehrlich, filed Dec. 27, 2002.

U.S. Provisional Patent Application No. 60/436,744 entitled "Systems Using Extended Servo Patterns with Multi-Pass Servowriting and Self-Servowriting," by Richard M. Ehrlich, filed Dec. 27, 2002.

U.S. patent application Ser. No. 10/420,452 entitled "Systems for Multi-Pass Self-Servowriting," by Richard M. Ehrlich, filed Apr. 22, 2003.

U.S. patent application Ser. No. 10/420,076 entitled "Systems for Self-Servowriting Using Write-Current Variation," by Richard M. Ehrlich, filed April 22, 2003.

U.S. patent application Ser. No. 10/420,498 entitled "Methods for Self-Servowriting Using Write-Current Variation," by Richard M. Ehrlich, filed Apr. 22, 2003.

U.S. patent application Ser. No. 10/624,252 entitled "Systems for Conditional Servowriting," by Richard M. Ehrlich, filed Apr. 22, 2003.

U.S. patent application Ser. No. 10/733,131 entitled "Methods to Determine Gross and Fine Positioning on a Reference Surface of a Media," by Richard M. Ehrlich et al., filed Dec. 10, 2003.

FIELD OF THE INVENTION

The present invention relates to methods to servowrite media for use in data storage devices, and systems for applying such methods.

BACKGROUND

Advances in data storage technology have provided for ever-increasing storage capability in devices such as DVD-ROMs, optical drives, and disk drives. In hard disk drives, for example, the width of a written data track has decreased due in part to advances in read/write head technology, as well as in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

BRIEF DESCRIPTION OF THE DRAWINGS

Further details of embodiments of the present invention are explained with the help of the attached drawings in which.

DETAILED DESCRIPTION

Figure 1:
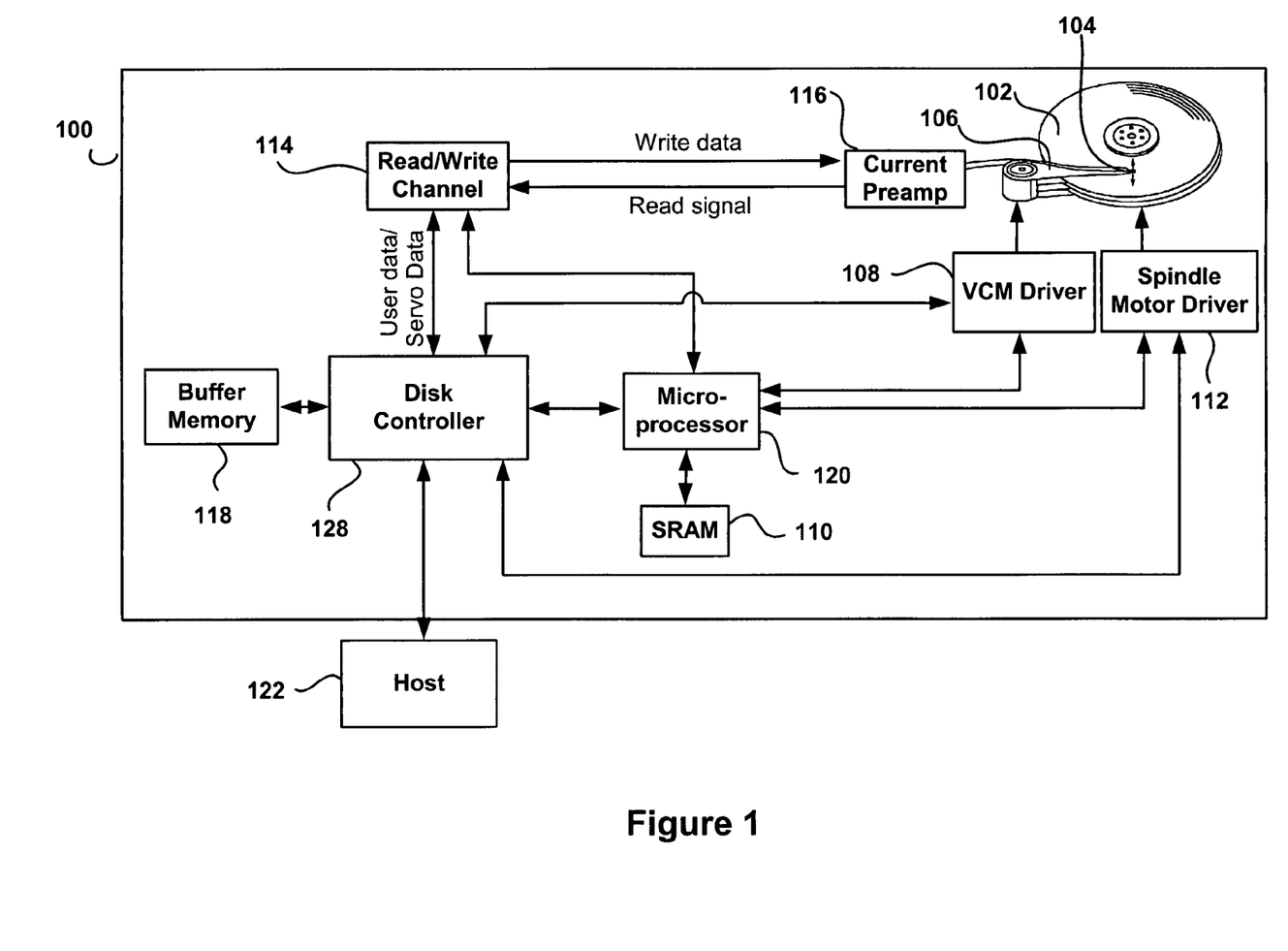
FIG. 1 is a diagram showing components of a disc drive that can be used in accordance with embodiments of the present invention.

Systems and methods in accordance with embodiments of the present invention can be used when servowriting, or self-servowriting, a rotatable storage medium in a data storage device, such as a hard disk drive. A hard disk drive can include at least one magnetic disk capable of storing information transferred through a read/write head. FIG. 1 is a schematic of an exemplary hard disk drive 100 for use with embodiments of the invention including at least one magnetic disk 102 and a read/write head 104 capable of storing information on at least one of the surfaces of the disk. The read/write head 104 is positioned over the surface of the disk by a closed-loop servo system that can be used to pivot a rotary actuator on which the head 104 is mounted or formed. The servo system can comprise a microprocessor 120 and a servo controller, the servo controller existing as circuitry within the hard disk drive 100 or as an algorithm resident in the microprocessor 120, or as a combination thereof. In other embodiments, an independent servo controller can be used. The servo system uses positioning data read by the head 104 to determine the position of the head 104 over the disk 102. When the servo system receives a command to position a head 104 over a track, the servo system determines an appropriate current to drive through a voice coil (not shown) of the rotary actuator 106 and commands a voice coil motor (VCM) driver 108 electrically connected with the voice coil to drive the current. A magnetic field produced by the current driven through the voice coil interacts with stationary magnets of a VCM, causing the actuator 106 to pivot.

The servo system can further include a spindle motor driver 122 to drive current through a spindle motor connected with the disk 102, thereby rotating the disk 102, and a disk controller 128 for receiving information from a host 122 and for controlling multiple disk functions. The host 122 can be any device, apparatus, or system capable of utilizing the hard disk drive 100, such as a personal computer or Web server. An interface controller can be included for communicating with the host 122, or the interface controller can be included in the disk controller 128. In other embodiments, the servo controller, VCM driver 108, and spindle motor driver 112 can be integrated into a single application specific integrated circuit (ASIC). One of ordinary skill in the art can appreciate the different means for controlling the spindle motor and the VCM.

The disk controller 128 can provide user data to a read/write channel 114, which can send data signals to a current amplifier or preamp 116 to be written to the disk(s) 102. The disk controller 128 can receive servo and/or user data signals read by the read/write head 104 from the read/write channel 114. The disk controller 128 can also send servo signals to the microprocessor 120, or the disk controller 128 can control the VCM and spindle motor drivers directly. The disk controller 128 can include a memory controller (not shown) for interfacing with buffer memory 118. In one embodiment, the buffer memory 118 can be dynamic random access memory (DRAM). The microprocessor 120 can include integrated memory (such as cache memory), or the microprocessor 120 can be electrically connected with external memory (for example, static random access memory (SRAM) 110 or alternatively DRAM).

Figure 2:
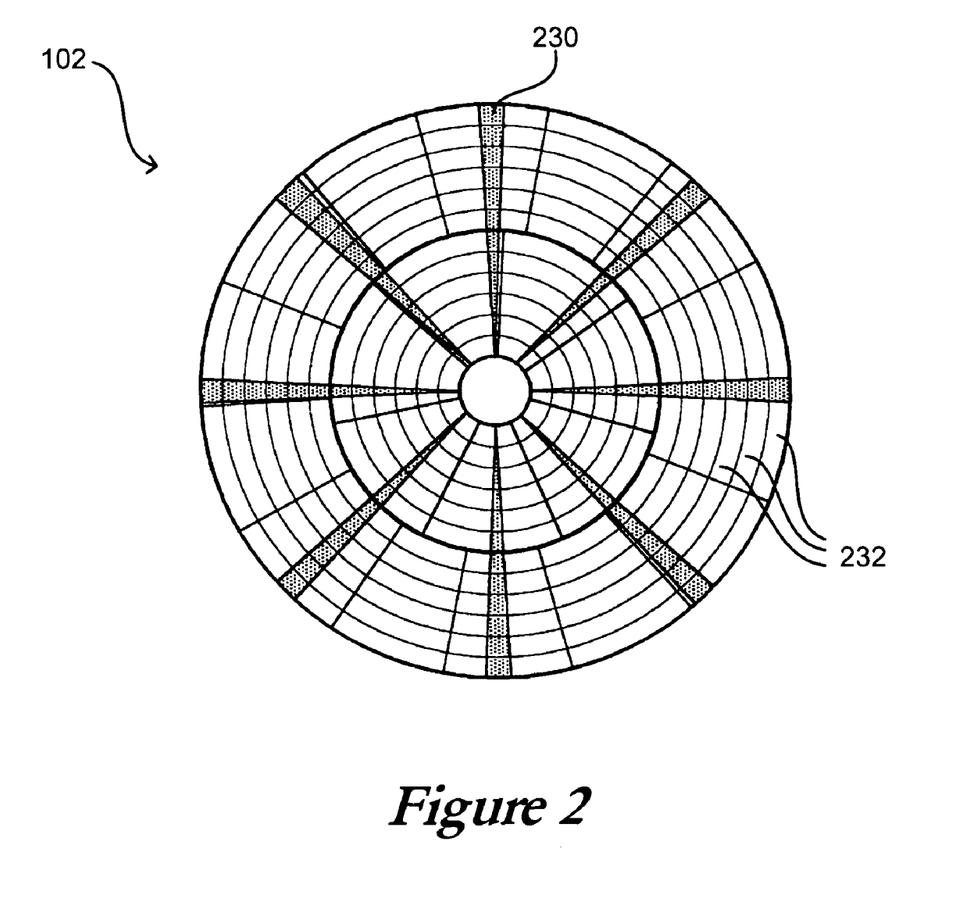
FIG. 2 is a diagram showing an example of a data and servo format for a disk in the drive of FIG. 1.

The information stored on such a disk can be written in concentric tracks, extending from near the inner diameter (ID) of the disk to near the outer diameter (OD) of the disk 102, as shown in the exemplary disk of FIG. 2. In an embedded servo-type system, servo information can be written in servo wedges 230, and can be recorded on tracks 232 that can also contain data. Data tracks written to the disk surface can be formatted in radial zones. Radial zones radiating outward from the ID can be written at progressively increased data frequencies to take advantage of an increase in linear velocity of the disk surface directly under a head in the respective radial zones. In a system where the actuator arm rotates about a pivot point such as a bearing, the servo wedges may not extend linearly from the ID to the OD, but may be curved slightly in order to adjust for the trajectory of the head as it sweeps across the disk.

Figure 3:
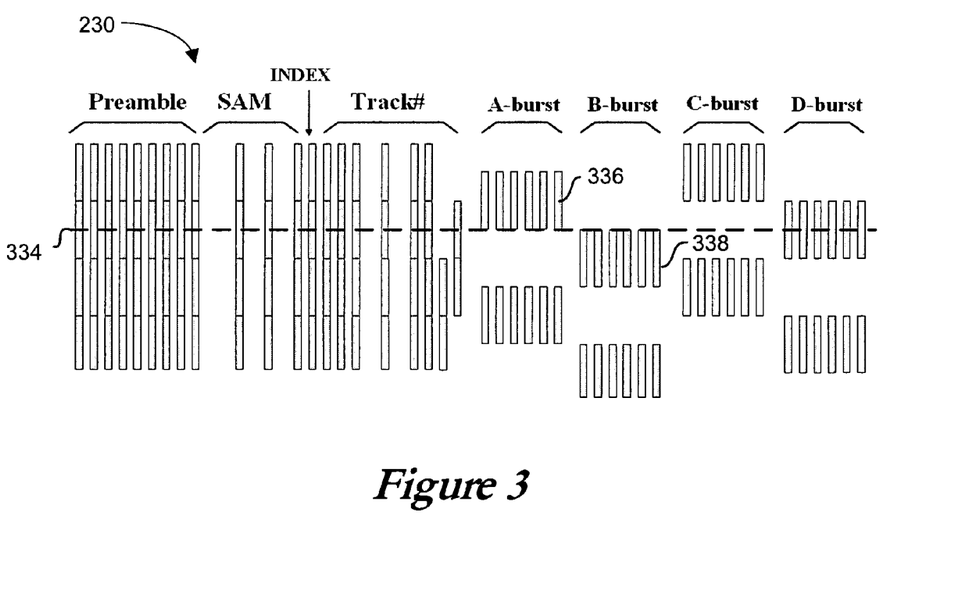
FIG. 3 is a diagram showing servo information that can be written to the tracks shown in FIG. 2.

FIG. 3 shows a portion of an exemplary final servo pattern within a servo wedge 230. The final servo pattern includes information stored as regions of magnetization. As shown in FIG. 3, where the at least one servo wedge 230 is longitudinally magnetized, grey blocks are magnetized to the left and white spaces are magnetized to the right, or vice-versa. Alternatively, where the at least one servo wedge 230 is perpendicularly magnetized, grey blocks are magnetized up and white spaces are magnetized down, or vice-versa. In other embodiments, such as in optical data storage devices, information can be stored as indicia other than regions of magnetization. For example, the information can be stored as optical indicia. The final servo pattern is read by the head 104 as the surface of the spinning disk 102 passes under the head 104. The servo pattern can include information identifying a data field and a position of the head relative to the data field. The information can include, for example, a servo address mark (SAM), track identification information, an index, etc. The exemplary final servo pattern illustrated in FIG. 3 is a simplification of a typical servo pattern. The servo information can be arranged in any order, and can include many more transition pairs than are illustrated (for example, the region containing track identification is truncated as shown, and commonly includes many more transition pairs than are illustrated). Further, additional information, such as partial or complete wedge number information, can be included in the final servo pattern. One of ordinary skill in the art can appreciate the myriad different arrangements of information that can be contained in a servo pattern. Systems and method in accordance with embodiments of the present invention should not be construed as being limited in scope to those examples provided herein.

Servo information often includes bursts of transitions called "servo bursts." The servo information can be positioned regularly about each track, such that when a data head reads the servo information, a relative position of the head can be determined that can be used by a servo processor to adjust the position of the head relative to the track. For each servo wedge, this relative position can be determined, in one example, as a function of the target location, a track number read from the servo wedge, and the amplitudes or phases of the bursts, or a subset of those bursts. The position of a head or element, such as a read/write head or element, relative to the center of a target track, will be referred to herein as a position-error signal (PES).

A centerline 334 for a given data track can be "defined" relative to a series of bursts, burst edges, or burst boundaries, such as a burst boundary defined by the lower edge of A-burst 336 and the upper edge of B-burst 338 in FIG. 3. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The PES scheme described above is one of many possible schemes for combining the track number read from a servo wedge and the phases or amplitudes of the servo bursts. For example, U.S. Pat. No. 5,381,281 to Shrinkle et al. describes a PES scheme including a quad-servo burst pattern in which the null-point is defined by a linear combination of the amplitudes of all four bursts, instead of simply the difference between two bursts as described immediately above. A quadrature-based track following algorithm applying a difference of sums of servo burst pair read voltages can minimize track following errors where servo bursts are mispositioned relative to one another. Such a scheme can benefit from embodiments of the present invention, as can many other track following schemes. One of ordinary skill in the art can appreciate the myriad different track following schemes for which embodiments of the present invention can be applied.

A disk drive can have tens of thousands of data tracks. A typical servo writing process can require, for example, 3.75 or more revolutions to complete steps for writing servo information for a data-track. If such a process requires on average roughly 4 revolutions to write each data-track, with 100,000 data-tracks and a spin-speed of 5400 RPM (90 Hz), for example, the process of writing servo wedges on each surface would take 4,444 seconds, or about 74 minutes. If the process is carried out on an expensive servowriter, this can add substantially to the cost of the drive. Thus, drive manufacturers are motivated to use self-servowriting techniques to reduce or eliminate time spent servowriting data tracks using servowriters.

One such self-servowriting technique uses a media-writer to write servo patterns on a stack of disks. Each disk is then placed in a separate drive containing multiple blank disks. The drive can use the patterned disk as a reference to re-write servo patterns on all of the other disk surfaces in the drive, as well to write servo patterns on the reference surface, if desired. The media-writer can be an expensive instrument, and it may still take a very long time to write a reference pattern on the stack of disks. However, if a stack contains 10 blank disks, for example, then the media-writer can write the reference pattern for 10 drives in the time that it would have taken to servowrite a single drive. This scheme is a member of a class of self-servowriting techniques commonly known as "replication" self-servowriting.

Alternatively, a printed media disk can be placed in a drive containing multiple blank disks in substitution of (or in addition to) a media having a servo pattern written by a media-writer. Such a printed media disk can include a reference pattern transferred from a reticle or die. The reference pattern is a coarse pattern containing clocking and radial position information, providing a reference for writing final servo wedges on the disk surfaces. Printing a servo pattern on a media surface can reduce the time and expense required to write the servo pattern on the surface by transferring at least a portion of the reference pattern in one step or series of steps, rather than writing servo data on a track-by-track basis.

A magnetic printing station can be used to magnetically print or otherwise transfer the reference pattern using a known transfer technique. One such transfer technique is described in "Printed Media Technology for an Effective and Inexpensive Servo Track Writing of HDDs" by Ishida, et al. IEEE Transactions on Magnetics, Vol. 37, No. 4, July 2001. A blank disk (the reference surface) is DC erased along the circumferential direction of the disk by rotating a permanent magnet block on the disk surface. A template, or "master", disk is then aligned with the blank disk and the two disks are securely faced with each other by evacuating the air between the two disk surfaces through a center hole in the blank disk. An external DC field is applied again in the same manner as in the DC erasing process, but with an opposite polarity. Other techniques for transferring a reference pattern to a disk are well known, and are likewise applicable to embodiments of the present invention.

Figure 4:
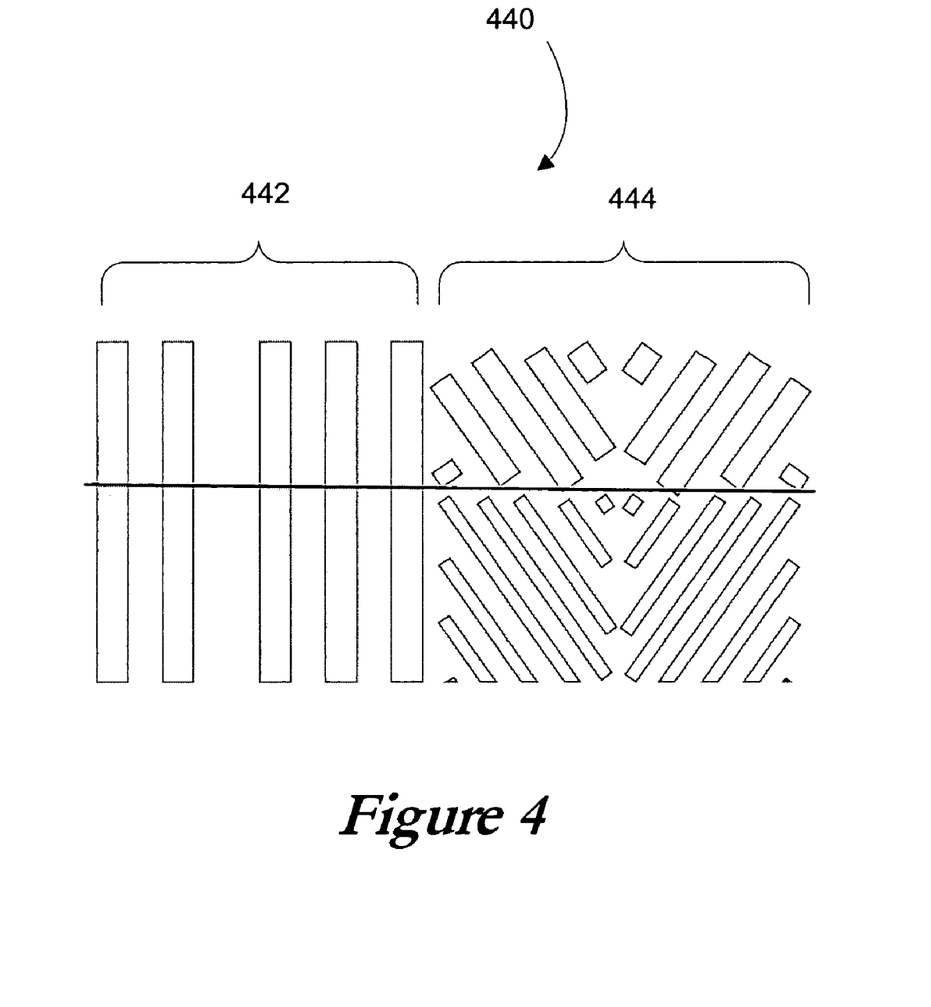
FIG. 4 illustrates a portion of a reference pattern having a burst-region with variable frequency chevrons in accordance with one embodiment of the present invention.

Systems and methods in accordance with embodiments of the present invention can utilize variable frequency chevrons in a printed media reference pattern on a reference surface of a rotatable medium to improve servo demodulation. Although for simplicity a single printed media reference pattern will be described, it should be understood that there are many possible reference patterns that can utilize aspects of various embodiments of the present invention. In the exemplary reference pattern 440 shown partially in FIG. 4 and described herein, a preamble 442 includes a phase-lock-loop (PLL) and automatic gain control (AGC) region that can allow a drive system to lock up the PLL and AGC loops. The preamble as illustrated is truncated and simplified for purposes of explanation, and can include many more pairs of transitions. This region can be followed by a servo address mark (SAM). The time at which the SAM is encountered can give the demodulation circuitry a timing reference which can be used to accurately determine the location of the servo-bursts, to determine the time at which to begin looking for the next SAM, and to lock up a self-servo write (SSW) clock. In addition to the preamble and SAM regions, additional information can be included in a reference pattern. For example, the reference pattern can include an index-mark, or some other information identifying rotational position. In addition, the reference pattern can include information describing gross-radial position, such as a marker zone, as described in U.S. patent application Ser. No. 10/733,131 entitled "Methods to Determine Gross and Fine Positioning on a Reference Surface of a Media". However, as shown in FIG. 4, following the SAM are servo-bursts 444. For printed media self-servo write (PM-SSW), the servo-bursts 444 in the reference pattern 440 can be pairs of oppositely-tilted chevrons, whose phase, relative to one another, can contain information about the radial position of a head, such as a read/write (R/W) head.

In an exemplary servo-demodulation scheme, such as those known to one of ordinary skill in the art, a digital servo demodulation circuit can digitize samples of the signal from the R/W head at a rate of 4 times per cycle of the servo-burst signal. Performing a discrete Fourier transform (DFT) of the signal (useful in determining the phase and/or magnitude of the bursts) can then involve multiplying signals by either 0, +1, or −1. That is, the circuitry need only add, subtract, or ignore samples to compute the DFT of a signal. In the printed media servo demodulation, it could be necessary to use such a low sample frequency to sample at 4 times per cycle of the signal that the front-end analog circuitry would require larger capacitors than is practical in low-cost integrated circuits.

Systems and methods in accordance with one embodiment for printed media self-servowrite (specifically, servoing on a printed-media pattern) allow the analog-to-digital converter (A/D) to sample many more than 4 times per cycle of the signal. For example, an A/D can sample a filtered signal at 20 times per cycle. After conversion, the channel can filter the signal with a hard-coded narrow band filter, centered at the expected burst-frequency. The channel can then digitally filter and down-sample the signal, such as to 4 samples per cycle, and can demodulate the burst using the "normal" DFT circuitry. Filtering or treatment of reference patterns of differing density using signal process techniques is known in the art. For example, such a technique for processing lower density printed reference patterns is described in U.S. Pat. No. 6,704,156 to Baker et al.

System and methods can take advantage of a "20×" factor by "down sampling" a signal over the chevrons by a factor of 5, producing 4 samples per cycle. A DFT can then be performed for each of the chevrons. For a part of the stroke, such as near the ID of the reference surface in ID region, this pattern can be used. At some distance toward the OD, the burst-frequency can be switched to a frequency higher than the original frequency. For example, if the servo burst frequency used near the ID were 6 MHz (a 6 MHz cycle-rate for the signal, with the channel sampling at 20× the cycle-rate, or 120 MHz), then the reference pattern can switch to a 9 MHz burst-frequency at mid-stroke. If the frequency at or near the ID is limited to 6 MHz by the minimum allowable feature dimension, then near mid-stroke (where the radius of a track can be about 1.5 times the radius at the ID), a 9 MHz burst frequency can be supported. The preamble, SAM, and any other digital information can be maintained at the original 6 MHz rate, in at least certain systems and methods. Maintaining this information at the low frequency can allow the channel to lock up its PLL and detect the SAM using a single frequency independent of the location of the R/W head. Once the R/W head passes over the burst-region where the higher-frequency bursts should be encountered, the system can "up-sample" the digitized signal, such that the resulting pseudo-samples can occur at 20× the new cycle frequency. It should be noted that in other embodiments, the A/D can sample at different rates. For example, the A/D can sample a filtered signal at 16 times per cycle.

For the example of a 1.5× frequency (new to original burst cycle frequency), the drive system can interpolate as follows. If the original stream of samples is denoted as $x_k$ (k is the index of the sample), 3 samples of $y_k$ can be produced for every 2 samples of $x_k$ received:

$$y_{3K}=3*x_{2K}$$

$$y_{(3K+1)}=x_{2K}+2*x_{(2K+1)}$$

$$y_{(3K+2)}=2*x_{(2K+1)}+x_{(2K+2)}$$

The resultant signal can then be passed through the same hard-coded band-pass filter used for the 6 MHz bursts, down-sampled, and a DFT taken as before.

In systems and methods in accordance with another embodiment, the hard-coded band-pass filter can be re-designed to deal with the 1.5× frequency signal as the "normal" frequency. Interpolation can be applied to make the reference pattern work with a burst-frequency that is only ⅔ of the new "normal" frequency. In such an embodiment, if the input signal is still denoted as $x_k$ and the output signal as $w_k$:

$$w_{2K}=2*x_{3K}$$

$$w_{(2K+1)}=x_{(3K+1)}+x_{(3K+2)}$$

This "down-sampled" signal processing can be used for the 6 MHz signal, and "normal" processing can be used for the 9 MHz signal. In the previous embodiment, "normal" signal processing can be used for the 6 MHz bursts, with "up-sampling" for the 9 Mhz bursts.

Signal processing techniques can be further be applied, for example, on an alternative reference pattern wherein chevrons near the ID are a lower frequency than digital information preceding the chevrons. Such a reference pattern can be useful, for example, where it is desired that the digital information be printed having a minimum feature size. An angle of a chevron requires that the chevron have a smaller feature width than a width of digital information preceding the chevron so that the width encountered by the R/W head—the product of the feature width and the sine of the chevron angle—is equivalent to the feature width of the digital information. Thus, the chevron limits the feature width of the digital information. However, if the chevron is printed (or servowritten) at a lower frequency and down-sampled (or the digital information is up-sampled), the digital information can be printed (or servowritten) having the minimum feature width. Optionally, the chevron pattern can be printed or servowritten at the higher frequency at some position along the stroke where the feature width is no longer a limiting factor.

Reference patterns can include higher frequency bursts that occupy no more space than previously occupied by the lower frequency bursts, but that allow more burst cycles in each wedge. Such an implementation can have the advantage of using a higher frequency signal (with a resulting lower position error signal (PES) noise), but can suffer a problem such as having a radial location where the burst frequency suddenly changes. Such a problem can be dealt with in any of a number of ways. In a first approach to dealing with such a problem, the drive system can simply deal with the fact that demodulation of the signal when the head straddles the two regions (of high frequency and low frequency bursts) may not be acceptable, or may be otherwise less than optimal. The drive system can keep careful track of the location of that region, and have the servo expect "bad" burst-demodulation there. Since the eccentricity of the disk can be as much as 100 microns or so, only two samples of a track may have the possibility of placing the head in such a "straddle" position. This can be due to the printed-media pattern moving in and out sinusoidally at the spin-speed, with the R/W head being held at a relatively constant radius to servowrite final wedges on a drive. If the decision is made to "spare-out" (i.e., mark as unusable) all of the affected tracks, it would represent about 400 data-tracks (at 100 KTPI, or 100000 tracks-per-inch; a typical track-density for drives in the near future). That might be 1% or so of the tracks in a 2.5-inch disk drive. That would be a high, but not unacceptable, penalty.

Figure 5:
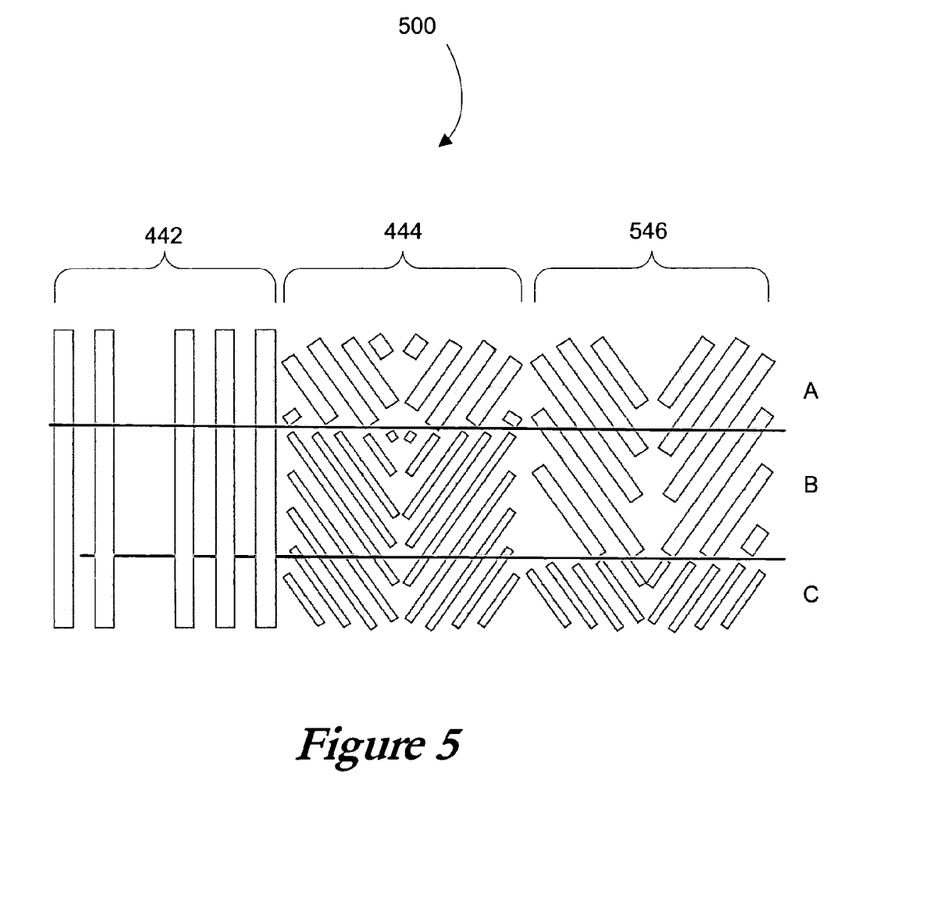
FIG. 5 illustrates a portion of a reference pattern having two sets of burst-regions with variable frequency chevrons in accordance with an alternative embodiment of the present invention.

In an alternative approach, two sets of burst-regions can be used for every wedge, as shown in FIG. 5. Near the ID (region A), both sets 444,546 can be low-frequency. Near the OD (region C), both sets 444,546 can be high frequency. In a middle, transition region B, which can be relatively narrow—such as on the order of, or slightly wider than, the maximum eccentricity of 100 microns—one set can contain low-frequency bursts and the other can contain high-frequency bursts. In the transition region B, either the low-frequency or the high-frequency bursts can be used. If writing is started at the OD, the high-frequency bursts (in both sets 444,546) can be used from the OD until near (but before) the start of the transition-region B. There, the drive system can switch to using the high-frequency bursts 444, or one of the two sets. Near (but before) the end of the transition region B, the drive can switch to using low-frequency bursts 546, or one of the two sets. Finally, once the head is "comfortably" beyond the transition region B, the drive system can use low-frequency bursts in both sets 444,546. It would be possible to suffer degraded PES noise, and thus degraded tracking, wherever only one set of bursts is being used. If the degradation is sufficiently poor, the drive system can "spare out" the affected tracks, as was possible for the first approach above. It may be more beneficial, however, to compensate for degraded PES noise using techniques such as multi-pass servowriting, additional WORF revolutions and/or conditional-servowriting. In multi-pass servowriting, additional passes allow patterns such as servo burst pairs to be written and/or trimmed on separate passes. The additional passes reduce the written runout, as the average misplacement decreases when the number of passes increases. Each burst in a servo pattern can also be written and/or trimmed in multiple passes. As PES noise degrades, more time can be spent burst trimming/writing, or in collection of WORF data. In conditional-servowriting, extra revolutions can be used to allow writing of servo digital and/or burst data only when the demodulated PES is within certain limits. Any subset of these techniques (or all of them) might be used to trade a higher time-penalty (in terms of revolutions spent per servo track written) for a written-in runout that is similar to that achieved over the rest of the drive's stroke, even though the PES noise is degraded, relative to what could be obtained with all of the bursts.

The example described herein uses two burst frequencies, with a factor of 3/2 difference in the frequencies. It should be understood that the invention can be extended to any number of different frequencies, such as may increase roughly in proportion with increasing radius of the disk, at the possible cost of more complexity in the "up-sampling" or "down-sampling" circuitry necessary, and in issues related to dealing with switches between frequencies. For example, where the frequency is doubled, a simplified interpolation scheme is required, or where the frequency is quintupled for every three samples, a more complicated interpolation scheme is required. At any one boundary between burst-frequencies, though, the servo can only be required to deal with two frequencies, namely the two on either side of the boundary. Further, the particular method of up-sampling and/or down-sampling the signal (using linear interpolation) is not the only possible method, as is apparent to one of skill in the art.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

We claim:

1. A reference pattern for a reference surface of a rotatable medium connectable with a hard disk drive having at least one head positionable over the reference surface, comprising:
   one or more servo wedges having a first end and a second end, the one or more servo wedges extending along a portion of a stroke of the at least one head and including:
      a preamble extending from the first end to the second end;
      at least one field extending from the first end to the second end and having:
   a first set of a plurality of phase-bursts forming a positive chevron angle relative to the preamble;
      a second set of a plurality of phase-bursts forming a negative chevron angle relative to the preamble; and
      wherein a frequency of the at least one field relative to the head when the rotatable medium is rotated at a spin speed varies between the first end and the second end.

2. The reference pattern of claim 1, wherein the frequency of the at least one field between the first end and a transition region is a first frequency;
   wherein the frequency of the at least one field between the transition region and the second end is a second frequency; and
   wherein the transition region is between the first end and the second end.

3. The reference pattern for claim 2, wherein the preamble includes digital information at the first frequency relative to the head when the rotatable medium is rotated at the spin speed.

4. The reference pattern of claim 2, wherein the frequency of the at least one field abruptly changes from the first frequency to the second frequency.

5. The reference pattern of claim 2, wherein the second frequency is higher than the first frequency.

6. A reference pattern for a reference surface of a rotatable medium connected with a data storage device having at least one head connected with an actuator, comprising:
   one or more servo wedges having a first end and a second end, the one or more servo wedges extending along a portion of a stroke of the at least one head and including:
      a preamble extending from the first end to the second end;
      a first field extending from the first end to the second end and having:
   a first set of a plurality of phase-bursts forming a positive chevron angle relative to the preamble;
      a second set of a plurality of phase-bursts forming a negative chevron angle relative to the preamble; and
      a second field extending from the first end to the second end and having:
a third set of a plurality of phase-bursts forming a positive chevron angle relative to the preamble;
   a fourth set of a plurality of phase-bursts forming a negative chevron angle relative to the preamble; and
wherein a frequency of the first field relative to the head when the rotatable medium is rotated at a spin speed and a frequency of the second field relative to the head when the rotatable medium is rotated at the spin speed vary between the first end and the second end.

7. The reference pattern of claim 6, wherein the first field frequency between the first end and a first transition is a first frequency;
   wherein the first field frequency between the first transition and second end is a second frequency;
   wherein the second field frequency between the first end and a second transition is the first frequency; and
   wherein the second field frequency between the second transition and the second end is the second frequency.

8. The reference pattern for claim 7, wherein the preamble includes digital information at the first frequency relative to the head when the rotatable medium is rotated at a spin speed.

9. The reference pattern of claim 7, wherein the first transition and the second transition are located at different radial positions.

10. The reference pattern of claim 7, wherein the first transition is located at a radial position closer to the first end than the second transition.

11. The reference pattern of claim 7, wherein the first transition is located at a radial position closer to the second end than the second transition.

12. The reference pattern of claim 7, wherein a transition region exists between the first transition and the second transition.

13. The reference pattern of claim 7, wherein one or both of the first field frequency and the second field frequency abruptly changes from the first frequency to the second frequency.

14. The reference pattern of claim 7, wherein the second frequency is higher than the first frequency.

15. A reference pattern for a reference surface of a rotatable medium connected with a data storage device having at least one head adapted to be positioned over the reference surface, comprising:

one or more servo wedges having an inner edge and an outer edge, the one or more servo wedges being disposed between an inner diameter of the reference surface and an outer diameter of the reference surface and including:

an inner region extending from the inner edge to a first transition;

a transition region extending from the first transition to a second transition; and an outer region extending from the second transition to the outer edge;

wherein at least a portion of each of the inner diameter region, the transition region, and the outer region, includes:

a preamble;

a first field, including:

a first set of a plurality of phase-bursts forming a positive chevron angle relative to the preamble;

a second set of a plurality of phase-bursts forming a negative chevron angle relative to the preamble; and a second field, including:

a third set of a plurality of phase-bursts forming a positive chevron angle relative to the preamble;

a fourth set of a plurality of phase-bursts forming a negative chevron angle relative to the preamble; and wherein in the inner region the first field is at the first frequency and the second field is at the first frequency;

wherein in the transition region one of the first field and the second field is at the first frequency and the other of the first field and the second field is at the second frequency; and wherein in the outer region the first field is at a second frequency and the second field is at the second frequency.

16. The reference pattern of claim 15, wherein the preamble includes digital information at the first frequency.

17. The reference pattern of claim 15, wherein the first transition and the second transition are located at different radial positions.

18. The reference pattern of claim 15, wherein the first transition is located at a radial position closer to the inner edge than the second transition.

19. The reference pattern of claim 15, wherein the first transition is located at a radial position closer to the outer edge than the second transition.

20. The reference pattern of claim 15, wherein one or both of the first field frequency and the second field frequency abruptly changes from the first frequency to the second frequency.

* * * * *